(12) United States Patent
Bram et al.

(10) Patent No.: US 7,252,902 B2
(45) Date of Patent: Aug. 7, 2007

(54) HIGH-TEMPERATURE RESISTANT SEAL

(75) Inventors: Martin Bram, Jülich (DE); Stephan Reckers, Aachen (DE); Hans Peter Buchkremer, Heinsberg (DE); Rolf Steinbrech, Jülich (DE); Detlev Stöver, Niederzier (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 10/490,662

(22) PCT Filed: Sep. 7, 2002

(86) PCT No.: PCT/DE02/03323

§ 371 (c)(1),
(2), (4) Date: Mar. 24, 2004

(87) PCT Pub. No.: WO03/032420

PCT Pub. Date: Apr. 17, 2003

(65) Prior Publication Data

US 2004/0195782 A1    Oct. 7, 2004

(30) Foreign Application Priority Data

Sep. 28, 2001 (DE) ............... 101 48 141
Aug. 9, 2002 (DE) ............... 102 36 731

(51) Int. Cl.
*H01M 2/08*    (2006.01)

(52) U.S. Cl. .......... 429/35; 277/652; 277/654
(58) Field of Classification Search .......... 277/652, 277/654, 592; 429/35
See application file for complete search history.

(56) References Cited

U.S. PATENT DOCUMENTS 4,830,698 A * 5/1989 DeCore et al. ........... 156/219

(Continued)

FOREIGN PATENT DOCUMENTS

BE    1006102    5/1994

(Continued)

OTHER PUBLICATIONS

Patent Abstracts 231784, Aug. 19, 1994,( Fuji Elec. Co. Ltd ).

(Continued)

*Primary Examiner*—Alison K. Pickard
(74) *Attorney, Agent, or Firm*—Andrew Wilford

(57) ABSTRACT

The invention relates to a high-temperature resistant seal, particularly a seal for use in a high-temperature fuel cell. The inventive seal comprises a structured metallic layer having at least one area on whose surface a filler is placed. The filler is comprised, in particular, of clay minerals or ceramic materials. The seal thus advantageously combines the sealing properties of a metallic layer, for example, of an undulated metal foil with the elastic properties of the filler. The seal is particularly suited for use at high temperatures and thus, for example, in high-temperature fuel cells.

1 Claim, 1 Drawing Sheet

U.S. PATENT DOCUMENTS

| | | | |
|---|---|---|---|
| 5,080,934 A * | 1/1992 | Naik et al. | 427/271 |
| 5,532,073 A * | 7/1996 | Hirata et al. | 429/34 |
| 6,092,811 A * | 7/2000 | Bojarczuk et al. | 277/627 |
| 6,117,580 A * | 9/2000 | Nitschke et al. | 429/34 |
| 6,153,326 A * | 11/2000 | Matsukawa et al. | 429/34 |
| 6,502,830 B2 * | 1/2003 | Teranishi et al. | 277/594 |
| 6,550,782 B2 * | 4/2003 | Okazaki et al. | 277/592 |
| 6,670,068 B1 * | 12/2003 | Diez | 429/35 |
| 6,777,126 B1 * | 8/2004 | Allen | 429/34 |
| 2003/0040420 A1 * | 2/2003 | Larsen et al. | 501/15 |
| 2005/0091838 A1 * | 5/2005 | Frank et al. | 29/623.2 |

FOREIGN PATENT DOCUMENTS

| | | |
|---|---|---|
| DE | 43 35 224 | 2/1995 |
| EP | 1 067 320 | 1/2001 |

OTHER PUBLICATIONS

Patent Abstracts 63 125861 May 30, 1988.

* cited by examiner

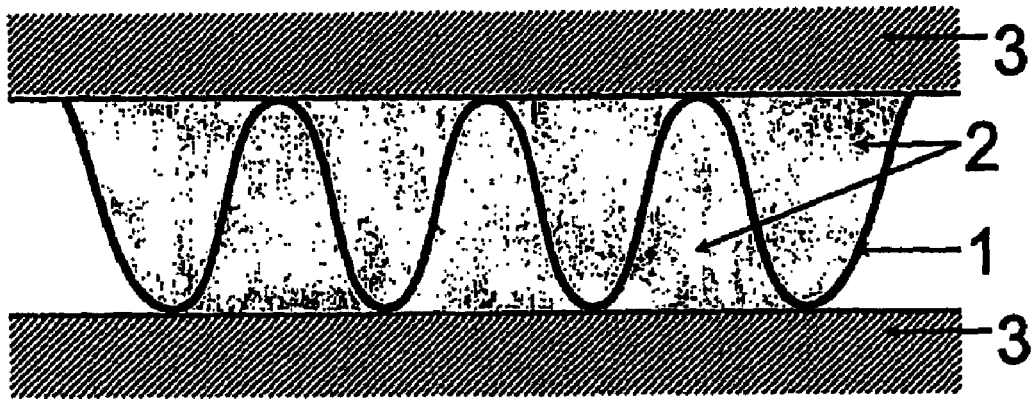
Figure 1
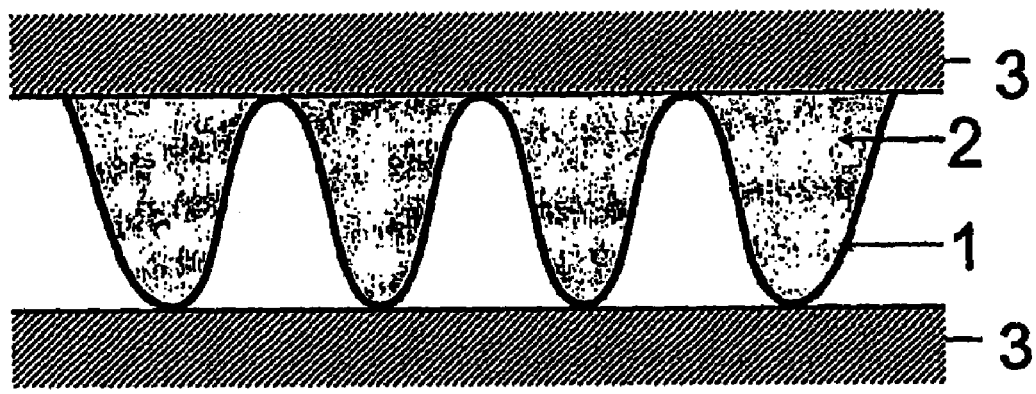
Figure 2
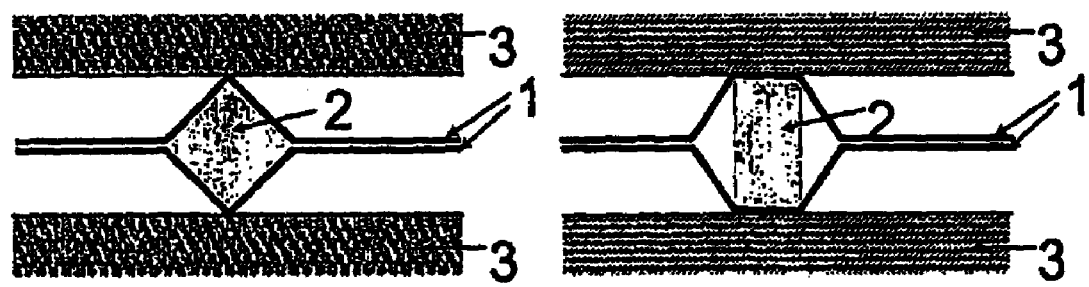
Figure 3  Figure 4

HIGH-TEMPERATURE RESISTANT SEAL

CROSS REFERENCE TO RELATED APPLICATIONS

This is a national stage of PCT/DE 0/03323 filed 7 Sep. 2002 and is based upon German national applications 101 48 141.1 filed 28 Sep. 2001 and 102 36 731.0 of 9 Aug. 2002 under the International Convention.

FIELD OF THE INVENTION

The invention relates to a high-temperature-resistant seal, especially a seal for use in a high temperature fuel cell.

STATE OF THE ART

High-temperature-resistant elements have usually different individual components with different coefficients of thermal expansion. They give rise, upon sealing between the individual components, independently of whether they are electrically conductive or insulating, especially in the case of thermocyclic modes of operation, to significant problems in the form of stresses or also cracks. Among such high-temperature-resistant components, one can count components for gas turbines or also for high-temperature fuel cells.

One type of high-temperature fuel cell is the high-temperature fuel cell utilizing a solid electrolyte (solid oxide fuel cell or SOFC) whose operating temperature can be up to 1000° C. At the cathode of a high-temperature fuel cell oxygen ions are formed in the presence of an oxidizing agent. The oxygen ions diffuse through the electrolyte and recombine at the anode side, with hydrogen arising from the fuel, to water. With this recombination, electrons are liberated and through this electric current, electrical energy can be derived from the fuel cell.

A multiplicity of fuel cells are as a rule connected together to produce larger electrical powers by connecting elements, also called interconnectors or bipolar plates. By means of bipolar plates, one can obtain stacked fuel cells which are disposed one above another and can be connected electrically in series. This arrangement is known as a fuel cell stack. The fuel cell stack is thus comprised of the interconnectors and the electrode-electrolyte units. A drawback with fuel cells and fuel cell stacks, but also as a general matter with high-temperature-resistant components is that the following problem arises: upon cyclical temperature loading, thermal stresses usually arise which are connected with relative movements of the individual components with respect to one another. These movements are based upon the different thermal expansion characteristics or the different thermal coefficients of expansion of the materials used.

For the sealing of individual components to one another, especially in the case of high-temperature fuel cells, glass solders with limited elasticity may be used, among other things, in the state of the art. As a result, thermal stresses can arise along with the danger of crack formation and loss of adhesion. Furthermore, in the state of the art, it is also possible that there will be insufficient compatibility between the comparatively high coefficient of thermal expansion, for example, of a metallic bipolar plate and the particular electrode or electrolyte material being used therewith and whose coefficient of thermal expansion can be comparatively smaller. As a result, disadvantageous thermal stress between the electrodes and interconnectors can develop which can lead to mechanical deterioration within the fuel cell. This problem is particularly serious with the glass solders which are mainly used in fuel cells since the fluid-tight sealing of the fuel cells within a stack must be insured.

OBJECT OF THE INVENTION

The object of the invention is to provide a high-temperature-resistant seal which can enable long term stability of sealing between components with different thermal expansion coefficients and optionally also allows electrical contact between the components.

SUMMARY OF THE INVENTION

The sealing according to the invention encompasses a structured metal layer with at least one region on the surface of which a filler is disposed. The metallic structured layer forms the support frame work of this seal and can, for example, be comprised of an embossed or stamped metal foil or also an embossed metal structure, especially hollow profiles. As the material for this metallic layer, high-temperature-resistant alloys, that is refractory metallic alloys like, for example, iron-chromium alloys, nickel-based alloys or also cobalt-based alloys can be used.

Alloys are especially suitable which, because of their aluminum content are protected against corrosion, i.e. which at high temperatures can give rise to the formation of a thin, dense $AL_2O_3$ oxide layer. With sufficient thickness of the $AL_2O_3$ layer which is formed, these effectively become electrically insulating. Preferably austenitic materials are used as the metallic layer since they are characterized by a sufficiently high creep resistance. The elastic properties of this metallic layer are defined especially by the profile geometry of the layer (flank angle, radius, number of corrugations, seal profile), the material of the sealing components and their heat treatment states.

Furthermore, the metallic layer of the seal of the invention has at least one region on which a filler is disposed. As the filler, especially clay materials or argillaceous minerals or also ceramic powders can be used. The clay minerals have, because of their platelet-like structures an elastic back-springing action upon pressure loading. Suitable argillaceous minerals include especially mica. These platelets frequently shimmer in light and are bright shining with a silvery or golden hue and often are mistaken for more valuable minerals. Mica serves among other things as an insulating material. This characteristic is here advantageous because the filler can have in addition an electrical insulating effect where appropriate. Its disintegration products are found in clay and can be important in ceramic manufacture. Suitable nonconducting ceramic fillers are oxide ceramics on the basis of $Al_2O_3$, $ZrO_2$, MgO, $TiO_2$, $Cr_2O_3$ or $SiO_2$ as well as their combinations in composite materials.

The fillers should have below 1000° C. advantageous elastic high temperature properties. Under this definition, it is to be understood that the fillers should have at the temperature of use, thermomechanical characteristics which do not vary over the long term. Typically, high-temperature fuel cells are operated at operating temperatures of 700° to 800° C. The seal according to the invention usually fulfills its function under suitable loading and even in the case of thermal cycling in temperature ranges from room temperature up to 1000° C.

In a refinement of the seal according to the invention, the filler which may be located only on one side of the structured metallic layer can be disposed on both sides thereof. Depending upon the amount of the filler which is applied to the metallic layer, the stiffness of the metallic layer, that is the foil, can vary and likewise the stiffness of the entire seal can vary. A two-sided arrangement of the filler generally gives rise to a stiffer seal.

With a profile geometry of the metallic layer as a corrugated profile, the filler is advantageously disposed in the troughs of the corrugations. In this manner, the sealing effect of the metallic layer is combined with an improved elasticity contributed by the filler which is used in a special manner.

The filler itself is as a rule not electrically conductive. In a seal which simultaneously must be used for electric contacting between the surfaces bridged by the seal, it should be noted that the filler is not disposed between the metallic layer and the component to be sealed since then it would serve to insulate the components to be sealed from one another.

A further refinement of the seal of the invention utilizes a hollow profile as the metallic layer and in the interior of the metallic profile, provides the filler.

BRIEF DESCRIPTION OF THE DRAWING

Below the invention will be described in greater detail in conjunction with Figures and embodiments. The drawing shows:

FIG. 1: a diagrammatic cross sectional view of an embodiment of the seal with a corrugated embossed metal foil and filler disposed on both sides thereof;

FIG. 2: a diagrammatic cross sectional view of an embodiment of the seal with a corrugated embossed metal foil and filler disposed at one side;

FIG. 3: a diagrammatic cross sectional view of an embodiment of the seal with two metallic layers which form a hollow profile and a filler therein; and FIG. 4: a diagrammatic cross sectional view of an embodiment of the seal with two metallic layers which form a hollow seal and the filler disposed therein.

SPECIFIC DESCRIPTION

In FIG. 1, an embodiment of the seal of the invention has a corrugated embossed metal foil 1 and filler 3 disposed on both sides thereof. The thermomechanical characteristics of this seal are influenced by the height of the seal, the number of corrugations as well as the inclination of the flanks. For a seal disposed between two components 3, there is necessary at least one corrugation with two contact lines (corrugation troughs) engaged against the first component and one contact line (corrugation crest) against the second component. The greater the number of contact lines the better the sealing action. On the other hand, if there are a large number of contact lines and consequently steeper flanks for each corrugation, the elasticity of the seal is as a rule reduced. The artisan thus will have to select suitably the profile geometry parameters for a given problem.

FIG. 2 shows a similar embodiment of the seal of the invention. By comparison to FIG. 1, however, the filler 2 is applied only to one side of the metallic layer 1. As a result the stiffness of the seal is reduced and its elasticity advantageously increased. To the extent that the metallic layer of the seal forms a sufficiently thick $Al_2O_3$ layer, electrical insulation of the components to be sealed thereby can result. This is especially the case in use of the seal in a high-temperature fuel cell. With a suitable choice of material for the metallic layer, however, electrical conductivity can be provided through the seal.

Further features of the seal according to the invention are illustrated in FIGS. 3 and 4. These each comprise two structured metallic layers 1 which form a kind of hollow body (hollow profile) in which the filler material 2 is disposed. Also in these embodiments, there should be an advantageous height of about 1 mm for the profile geometry of the square hollow body. Depending upon the geometrical arrangement, the seal can engage the component to be sealed with a contact line (FIG. 3) or a contact surface (FIG. 4). Depending upon the purpose of the seal or its application, an arrangement with a contact line can be advantageous and provide an improved sealing effect while an arrangement with a contact surface has the advantage of simple fabrication.

SPECIFIC EXAMPLES

A corrugated profile formed by embossing a metal foil of an austenitic nickel based alloy is used.

Material numbers: 2,4633, 2,4668 and 2,4665,
Foil thickness 0.030 to 0.6 mm, preferably 0.1 to 0.2 mm
Flank angle 20 to 50°, preferably 30°
profile height 0.5 to 5 mm, preferably 1 mm
Number of corrugations 1 to 4, preferably 2.

A hollow profile of an embossed metal foil of austenitic nickel based alloy is used.

Material numbers: 2,4633, 2,4668 and 2,4665,
Foil thickness 0.030 to 0.6 mm, preferably 0.1 to 0.2 mm
Flank angle 30 to 50°, preferably 45°
Profile height 0.5 to 5 mm, preferably 1 mm
Number of corrugations 1 to 2, preferably 1.

The invention claimed is:

1. A high-temperature fuel cell stack having two fuel cell components and an elastic seal interposed between said components, said seal comprising a structured metal foil composed of an austenitic nickel alloy with a thickness of 0.030 to 0.6 mm and at least one corrugation or compartment defined by flanks with a flank angle of 20° to 50°, said foil being in line or surface contact with said components, and an elastic argillaceous or ceramic filler filling troughs of a corrugation on at least one side of said foil or said compartment.

* * * * *